United States Patent
Ady et al.

(10) Patent No.: US 6,694,149 B1
(45) Date of Patent: Feb. 17, 2004

(54) METHOD AND APPARATUS FOR REDUCING POWER CONSUMPTION IN A NETWORK DEVICE

(75) Inventors: Roger W. Ady, Chicago, IL (US); Peter A. Kindinger, Cary, IL (US); Robert G. Uskali, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/469,868

(22) Filed: Dec. 22, 1999

(51) Int. Cl.[7] ................................. H04Q 7/20
(52) U.S. Cl. ....................... 455/522; 455/420
(58) Field of Search ................ 455/38.3, 54, 343, 455/517, 53, 522, 418, 419, 420; 370/94.1

(56) References Cited

U.S. PATENT DOCUMENTS

| | | | | |
|---|---|---|---|---|
| 4,449,248 A | * | 5/1984 | Leslie et al. | 340/7.36 |
| 5,241,542 A | * | 8/1993 | Natarajan et al. | 370/311 |
| 5,268,900 A | * | 12/1993 | Hluchyj et al. | 370/355 |
| 5,566,366 A | * | 10/1996 | Russo et al. | 455/343.5 |
| 5,752,202 A | * | 5/1998 | Obright | 455/574 |
| 5,790,946 A | * | 8/1998 | Rotzoll | 455/343.1 |
| 5,812,799 A | * | 9/1998 | Zuravleff et al. | 710/17 |
| 6,009,319 A | * | 12/1999 | Khullar et al. | 340/7.38 |
| 6,192,230 B1 | * | 2/2001 | van Bokhorst et al. | 455/343.3 |
| 6,236,365 B1 | * | 5/2001 | LeBlanc et al. | 342/450 |
| 6,236,674 B1 | * | 5/2001 | Morelli et al. | 375/219 |
| 6,236,850 B1 | * | 5/2001 | Desai | 455/343.2 |
| 6,438,375 B1 | * | 8/2002 | Muller | 455/435.3 |

* cited by examiner

Primary Examiner—Nay Maung
Assistant Examiner—Tan Trinh
(74) Attorney, Agent, or Firm—John V. Silverio

(57) ABSTRACT

A method and apparatus for reducing power consumption in a network device (104, 105, 106, 107) is provided. A network device (104, 105, 106, 107) is placed in a quiescent mode and scheduled to switch to an active mode at a scheduled time. At the scheduled time, the network device (104, 105, 106, 107) is activated. A control message (402, 403, 404, 405) is received by the network device (104, 105, 106, 107). The control message (402, 403, 404, 405) includes an indication as to whether or not the network device (104, 105, 106, 107) should remain in the active mode in preparation of receiving a data message (608, 609). If the control message (402, 403, 404, 405) indicates that the network device (104, 105, 106, 107) need not remain in the active mode, the network device (104, 105, 106, 107) sets a new scheduled time and returns to the quiescent mode. However if the control message (402, 403, 404, 405) indicates that the network device (104, 105, 106, 107) should remain in the active mode in preparation of receiving a data message (608, 609), the network device (104, 105, 106, 107) remains in the active mode and receives the data message (608, 609). After the data message (608, 609) has been received, the network device (104, 105, 106, 107) returns to the quiescent mode. Thus, power consumption in the network device (104, 105, 106, 107) is reduced.

11 Claims, 8 Drawing Sheets

METHOD AND APPARATUS FOR REDUCING POWER CONSUMPTION IN A NETWORK DEVICE

FIELD OF THE INVENTION

The invention relates generally to data networks and more specifically to a technique for reducing power consumption in a network device.

BACKGROUND OF THE INVENTION

As networking has become more popular and users demand higher bandwidth, existing communication networks are adapted to facilitate data transmission. For example, telephone modems were applied to telephone lines to allow the public switched telephone network to support data transmission. Likewise, cable television networks have been adapted to allow the use of cable modems for data communication at higher data rates than those afforded by traditional telephone modems. While cable modems have been offered as stand-alone desktop devices, there is a desire to be able to integrate cable modems into products such as desktop and portable computers, set-top boxes, and video equipment. However, high power demands of current cable modems result in high heat dissipation and impede efforts to miniaturize cable modems and integrate them into other products. The bulkiness, high power demands, and high heat dissipation prevent cable modems from being integrated into other products that would benefit from being connected to a network, for example, power, gas, and electric meters, security systems, and household appliances.

Technologies are also being developed to allow telephone communications over cable television networks. However, telephone communications can be essential in emergencies and thus need to be very reliable. Battery backup systems can be used to power a cable modem used for providing telephone communications. Unfortunately, because of the high power demands of current cable modems, such battery backup systems would either require very large and heavy batteries or would offer only a very short amount of backup time.

Because of the data speeds and communication frequencies used by cable modems, such modems inherently tend to draw large amounts of power. Thus, a cable modem cannot be easily redesigned using conventional techniques to reduce power consumption. Techniques for reducing power consumption in cable modems tend to require use of expensive components, and heat dissipation problems require costly and bulky heatsinks and fans.

Attempts have been made to reduce power consumption of cable modems by placing them in a quiescent mode, but such attempts have failed because of the long period of time required to reactivate the cable modem from the quiescent mode. Thus, cable modems have had to be maintained in an active receive mode continuously, consuming large amounts of power. Thus, a technique is needed to reduce the power consumption of a cable modem.

DETAILED DESCRIPTION OF A PREFERRED EMBODIMENT

A method and apparatus for reducing power consumption in a network device is provided. A network device is placed in a quiescent mode and scheduled to switch to an active mode at a scheduled time. At the scheduled time, the network device is activated. A control message is received by the network device. The control message includes an indication as to whether or not the network device should remain in the active mode in preparation of receiving a data message. The scheduled time is set sufficiently in advance of the control message to allow adequate time for activation of the network device prior to communication of the control message.

If the control message indicates that the network device need not remain in the active mode, the network device sets a new scheduled time and returns to the quiescent mode. However if the control message indicates that the network device should remain in the active mode in preparation of receiving a data message, the network device remains in the active mode and receives the data message. After the data message has been received, the network device returns to the quiescent mode.

Multiple groups may be defined, with each group having its own control messages, allowing distribution of network devices among several groups to increase efficiency. Network devices may also be reassigned from one group to another to further increase efficiency.

Figure 1:
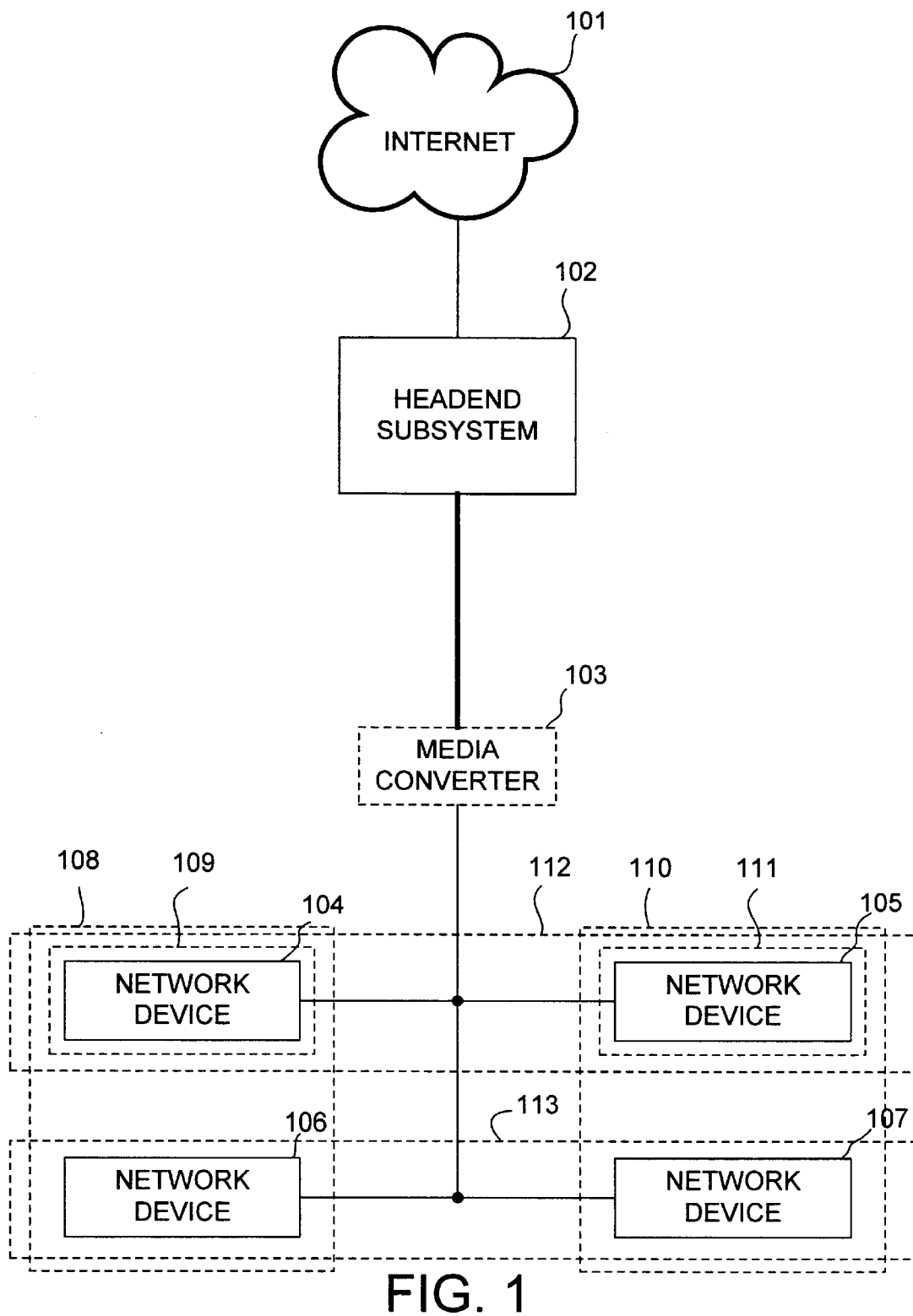
FIG. 1 is a block diagram illustrating a network system.

FIG. 1 is a block diagram illustrating a network system. The network system includes internet 101, headend subsystem 102, media converter 103, and network devices 104, 105, 106, and 107. Internet 101 may be any information network, for example a global information network. Internet 101 is coupled to headend subsystem 102. Headend subsystem 102 communicates with internet 101 and network devices 104, 105, 106, and 107. Headend subsystem 102 is coupled to media converter 103. Media converter 103 is coupled to network devices 104, 105, 106, and 107. Communication between headend subsystem 102 and network devices 104, 105, 106, and 107 is effected by media converter 103. Internet 101 may include an additional data source to provide data to headend subsystem 102 that is routed differently from other internet traffic.

For example, in a hybrid fiber/coax (HFC) cable system, a fiber optic cable supports communication between the headend subsystem 102 and the media converter 103, and coaxial cable supports communication between media converter 103 and network devices 104, 105, 106, and 107. The media converter 103 converts the media over which the communication occurs. For example, in a HFC cable system, the media converter 103 passes signals between the fiber optic cable and the coaxial cable. However, media converter 103 may be unnecessary if a continuous medium is used between the headend subsystem 102 and network devices 104, 105, 106, and 107. Any suitable medium or media may be used between headend subsystem 102 and network devices 104, 105, 106, and 107. For example, besides fiber optic cable and coaxial cable, other media such as twisted pair cable, wireless, or satellite communication may be used.

The invention may be applied to a network system. For example, the invention may be applied to a cable modem or to a cable modem termination system, such as one located at a headend subsystem 102 and used to communicate with cable modems located as indicated by network devices 104, 105, 106, and 107. The invention may be applied to the cable system as a whole, including a cable modem and a cable modem termination system.

The network devices are divided into groups. For example, network devices 104 and 106 constitute a first plurality of network devices assigned to a first group 108. Network devices 105 and 107 constitute a second plurality of network devices assigned to a second group 10. If the headend subsystem 102 has a data message destined for network device 104, network device 104 is placed in a first active set 109. If the headend subsystem 102 has a data message destined for network device 105, network device 105 is placed in a second active set 111.

Each of network devices 104, 105, 106, and 107 may include several components, for example a frequency synthesizer, an automatic gain control (AGC) circuit, a quadrature amplitude modulation (QAM) circuit, and other circuits. The different components may require different amounts of time to transition from a quiescent mode to an active mode. A staggered transition process is provided to ensure all components are activated in time to receive the control message, while still minimizing power consumption.

The groups, such as first group 108 and second group 110, may be geographically distributed. For example, by avoiding assigning many network devices in a similar geographic region to similar groups, the group may be spread evenly among network devices in different geographic regions. Such geographic regions may be separate and distinct physical locations or separate subsystems that include a plurality of network devices and common equipment for those network devices, such as media converter 103.

For example, a first geographic region 112 may be defined to include network device 104 and network device 105, and a second geographic region 113 may be defined to include network device 106 and network device 107. Since network device 104 of the first geographic region 112 is assigned to the first group 108, and network device 105 of the first geographic region 112 is assigned to the second group 110, the network devices of the first geographic region 112 are spread evenly among the first group 108 and the second group 110. Likewise, since network device 106 of the second geographic region 113 is assigned to first group 108 and network device 107 of the second geographic region 113 is assigned to second group 110, the network devices of the second geographic region 113 are spread evenly among the first group 108 and the second group 110.

Providing geographic diversity within groups is a beneficial feature of an embodiment of the invention. For example, as cable modems are equipped to provide additional services that typically require higher reliability, the reliability of the cable modems needs to improve. One example of such additional services is the use of cable modems to provide telephone service. To increase the immunity of such cable modems to power interruptions, power may be provided for the cable modems from a common source. For example, a first common power source may be coupled to network device 104 and network device 105 in first geographic region 112, and a second common power source may be coupled to network device 106 and network device 107 in second geographic region 113. By providing a common power source within the network, rather than separate local power sources at each network device, local power disturbances at the network devices need not cause interruption of service for those network devices.

By assigning network devices dependent upon a specific common power source to different groups, the control messages associated with those different groups occur at different times, thereby causing activation of the network devices at different times. This serves to reduce the peak power demands placed on the common power source, thereby increasing its reliability. It further serves to reduce the peak bandwidth associated with each geographic region, thereby increasing the throughput of data communicated within each geographic region.

Figure 2:
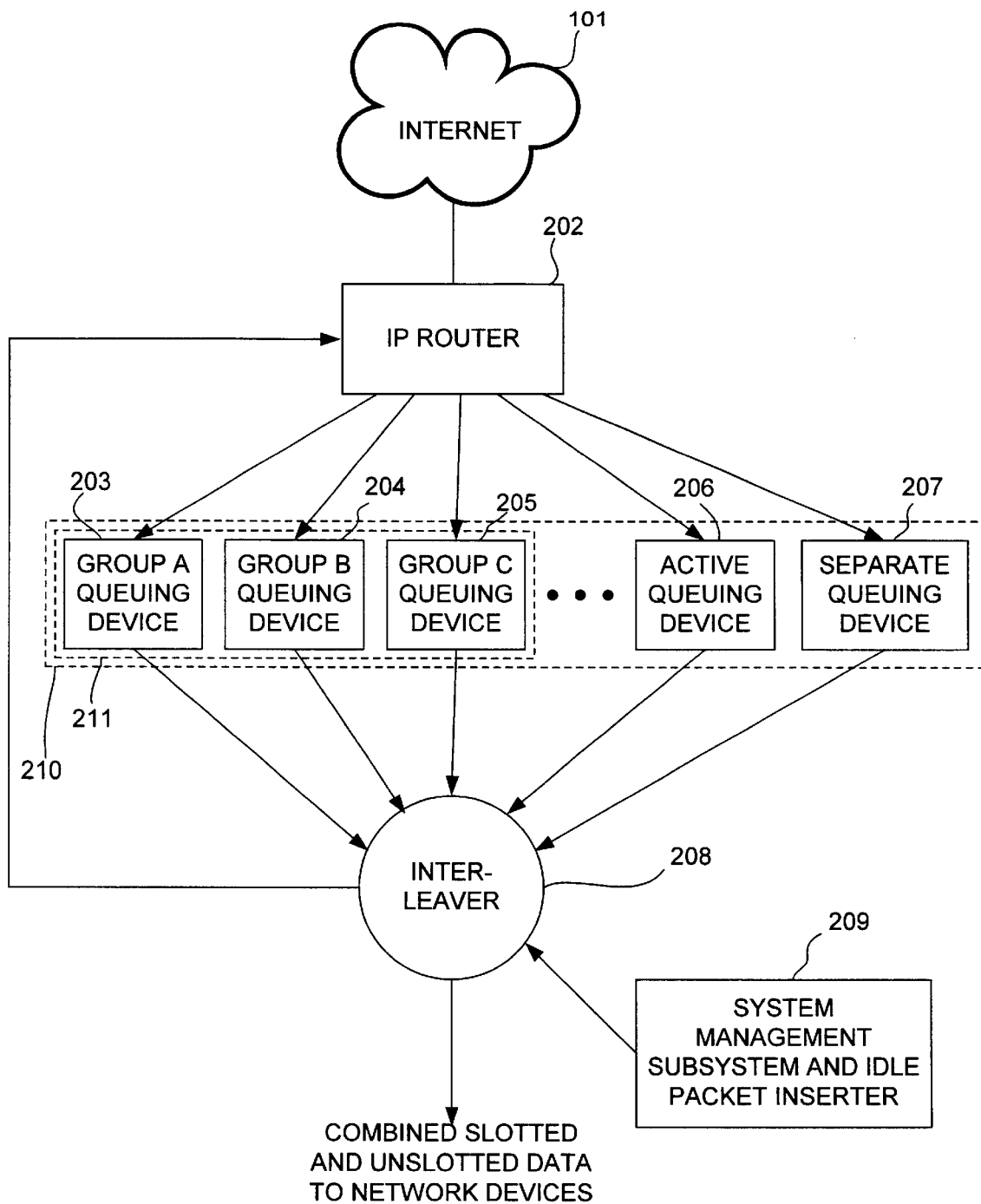
FIG. 2 is a block diagram illustrating an embodiment of the present invention.

FIG. 2 is a block diagram illustrating an embodiment of the present invention. Internet 101 is coupled to internet protocol (IP) router 202. IP router 202 is coupled to a plurality of queuing devices 210. The plurality of queuing devices 210 includes a plurality of group queuing devices 211, an active queuing device 206, and a separate queuing device 207. The plurality of group queuing devices 211 include group A queuing device 203, group B queuing device 204, and group C queuing device 205. The plurality of queuing devices 210 are coupled to interleaver 208. Interleaver 208 is coupled to IP router 202 and to system management subsystem and idle packet inserter 209. Interleaver 208 is also coupled to network devices, such as network devices 104, 105, 106, and 107.

Figure 6:
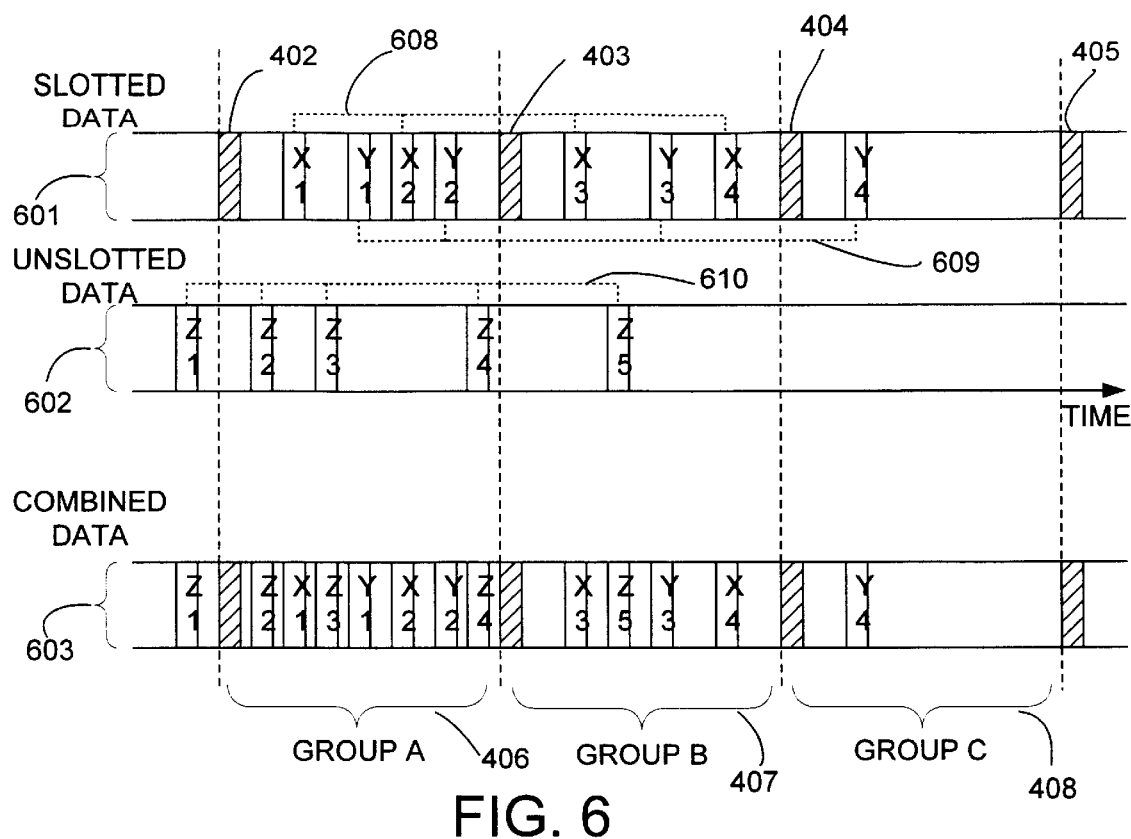
FIG. 6 is a diagram illustrating control packets and data packets being communicated according to an embodiment of the invention.

Internet traffic from internet 101 passes to IP router 202. IP router 202 routes the internet traffic to the appropriate queuing devices of the plurality of queuing devices 210. The plurality of queuing devices 210 pass the internet traffic to interleaver 208. Interleaver 208 organizes the internet traffic from the plurality of queuing devices 210 sequentially as a data stream 603, as illustrated in FIG. 6. In any time slots in the data stream that do not contain data representing the internet traffic, the interleaver 208 adds system management messages or idle packets from system management subsystem and idle packet inserter 209. Interleaver 208 communicates with IP router 202 to coordinate assignment and reassignment of network devices among the plurality of queuing devices 210.

The plurality of group queuing devices 211 are used to queue messages for network devices assigned to specific groups. For example, messages for network devices assigned to group A are queued by group A queuing device 203. Messages for network devices assigned to group B are queued by group B queuing device 204. Messages for network devices assigned to group C are queued by group C queuing device 205. When a control message indicates that a network device in a particular group should remain in an active mode and prepare to receive a data message, that network device is reassigned from its group queuing device to the active queuing device 206. Subsequent traffic for that network device is queued by active queuing device 206 until the network device returns to its quiescent mode.

Backwards compatibility with the prior art network devices is also provided. Network devices that are not assigned to a particular group, such as network devices which do not support a quiescent mode, may be coupled to interleaver 208. Traffic from internet 101 for such devices is routed by IP router 202 to separate queuing device 207. Separate queuing device 207 passes the traffic to interleaver 208, which incorporates the traffic into the data stream to the network device.

Figure 3:
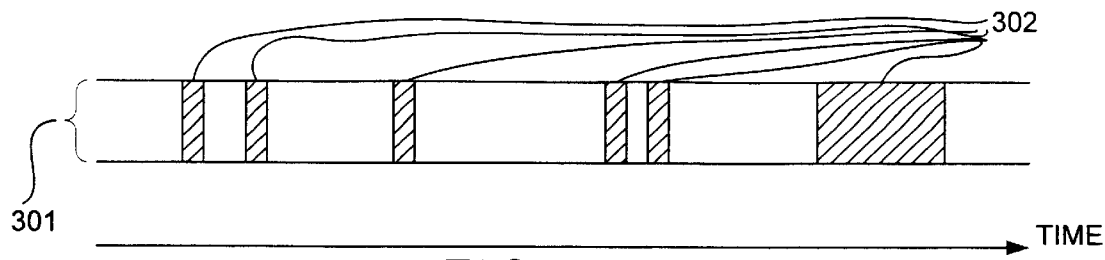
FIG. 3 is a diagram illustrating data packets destined for a network device being communicated over time according to a technique in the prior art.

FIG. 3 is a diagram illustrating data packets destined for a network device being communicated over time according to a technique in the prior art. Data stream 301 includes data packets 302. The data packets 302 may occur at any time in the data stream 301. Therefore, any network devices that expect to receive data packets 302 must remain activated at all times, thereby consuming energy continuously.

Figure 4:
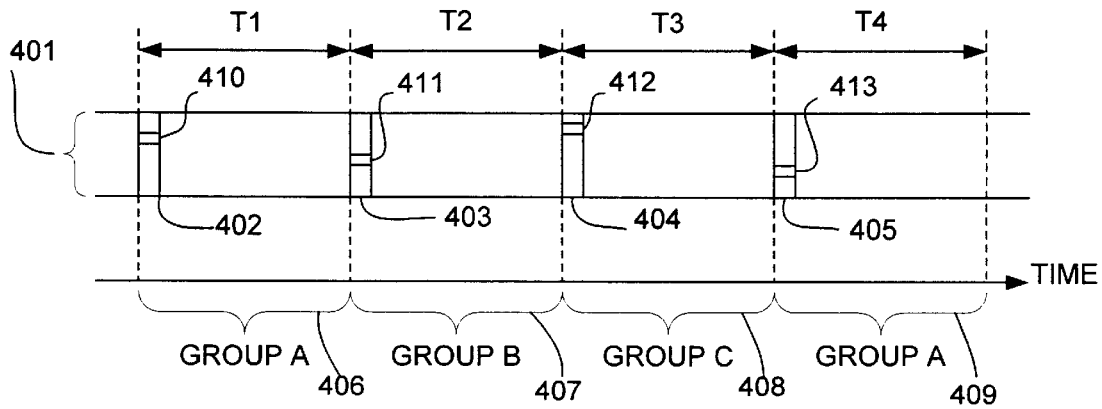
FIG. 4 is a diagram illustrating control messages for several groups being communicated according to an embodiment of the invention.

FIG. 4 is a diagram illustrating control messages for several groups being communicated according to an embodiment of the invention. A control message is transmitted for each group, staggered in time from the other groups. A time slot is defined for each control message to include the time the control message is transmitted and the following time until another control message is transmitted. For example, a time slot 406 is defined for group A to include the time during which the control message 402 for group A is transmitted and the following time until the control message 403 for group B is transmitted. Time slot 406 has a duration T1. Likewise, a time slot 407 is defined for group B including control message 403 and having a duration T2. A time slot 408 is defined for group C including control message 404 and having a duration T3. A second occurrence of a time slot for group A is defined as time slot 409, which includes control message 405 and has a duration T4. The duration T4 may be identical to or different from the duration T1. Likewise, the durations T2 and T3 may be identical to or different from the duration T1. Taken together, these control messages and their corresponding time slots form a control stream 401. Control message 402 includes indication 410, control message 403 includes indication 411, control message 404 includes indication 412, and control message 405 includes indication 413.

For a given group, the control message for that group serves to keep network devices in that group that have data messages pending to remain activated so that the network devices may receive the messages. Thus, to minimize the amount of time that the network devices need to remain activated, the data messages for network devices in a group should be transmitted as soon after the control message for that group as possible. Therefore, for network devices in group A that have data messages pending at the time control message 402 is transmitted, most of those data messages will be transmitted during time slot 406. However, the transmission of data messages for network devices is not limited to time slot 406. If there is insufficient time during time slot 406 to transmit all of the data messages destined for network devices in group A, additional packets of these messages for network devices in group A can be transmitted in following time slots, such as time slots 407, 408, and 409. Thus, the invention is capable of providing lower latency for high-bandwidth network devices, since, for example, network devices in group A do not need to wait from time slot 406 to time slot 409 to continue receiving a data message that could not be completed in time slot 406.

Figure 5:
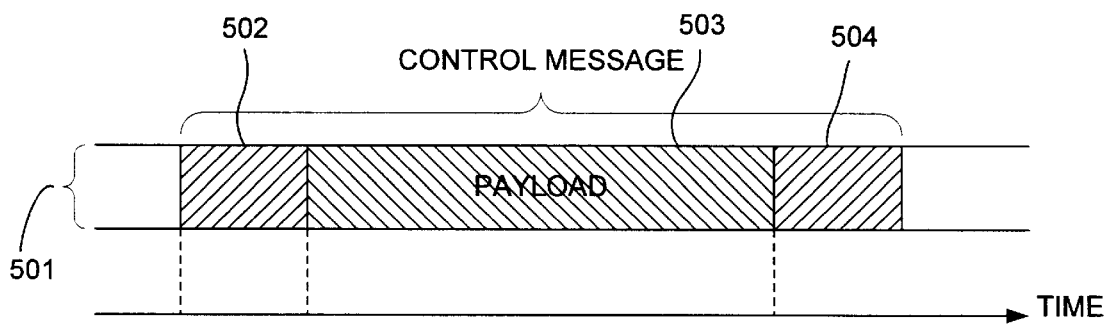
FIG. 5 is a diagram illustrating the structure of a control message according to an embodiment of the invention.

FIG. 5 is a diagram illustrating the structure of a control message according to an embodiment of the invention. The control message is transmitted over a portion 501 of control stream 401. The control message includes a preamble 502, a payload 503, and a segment 504. The control message begins with the preamble 502. The preamble 502 identifies the group to which the control message pertains. The preamble 502 is followed by a payload 503. The payload 503 identifies the network devices within the group that have data messages pending. This identification in the payload 503 of network devices within the group that have data messages pending can serve as an indication that these network devices should remain in the active mode and prepare to receive data messages. The payload 503 is followed by segment 504. Segment 504 may include information for verifying accurate reception of the control message, such as a checksum or error correction codes, and information denoting the end of the control message.

FIG. 6 is a diagram illustrating control packets and data packets being communicated according to an embodiment of the invention. FIG. 6 includes illustrations of a data stream 601 containing slotted data (i.e., data messages transmitted according to the time slots defined in FIG. 4), a data stream containing unslotted data (i.e., data messages transmitted without reference to time slots), and a data stream 603 containing combined data (both slotted data and unslotted data interleaved in time).

Referring to data stream 601, control messages 402, 403, 404, and 405 are transmitted over time. Network devices X and Y are assigned to group A, the group to which control message 402 is associated. Control message 402 occurs at a first known time and provides an indication, for example, that network devices X and Y have data messages destined for them. Thus, network devices X and Y remain in the active mode and prepare to receive the data messages. Data message 608 is transmitted to network device X as a sequence of data packets X1, X2, X3, and X4. As can be seen, data packets X1, X2, X3, and X4 span multiple adjacent time slots. Data packets X1 and X2 are communicated during time slot 406, which is associated with group A, while data packets X3 and X4 are communicated during time slot 407, which is associated with group B.

Data message 609 is transmitted to network device Y as a sequence of data packets Y1, Y2, Y3, and Y4. Data packets Y1, Y2, Y3, and Y4 span multiple adjacent time slots. Data packets Y1 and Y2 are communicated during time slot 406, which is associated with group A, while data packet Y3 is communicated during time slot 407, which is associated with group B, and data packet Y4 is communicated during time slot 408, which is associated with group C.

Referring to data stream 602, a sequence 610 of data packets Z1, Z2, Z3, Z4, and Z5 destined for a network device Z is transmitted without reference to defined time slots. Data packet Z1 is communicated prior to time slot 406, data packets Z2, Z3, and Z4 are communicated during time slot 406, and data packet Z5 is communicated during time slot 407. However, while data packets Z1, Z2, Z3, Z4, and Z5 occur during time slots, their timing is independent of the time slots, and neither the source of data packets Z1, Z2, Z3, Z4, and Z5, nor network device Z needs to be coordinated with or even aware of the time slots.

Referring to data stream 603, includes the traffic of both data streams 601 and 602. As can be seen, this traffic includes data packets destined for devices X, Y, and Z. The data packets are present in time slots 406, 407, and 408, as well as before time slot 406. In the event that the timing of data packets in data stream 601 would conflict with the timing of data packets in data stream 602, an interleaver can adjust the timing of the data packets in data stream 603 to avoid conflicts.

Figure 7:
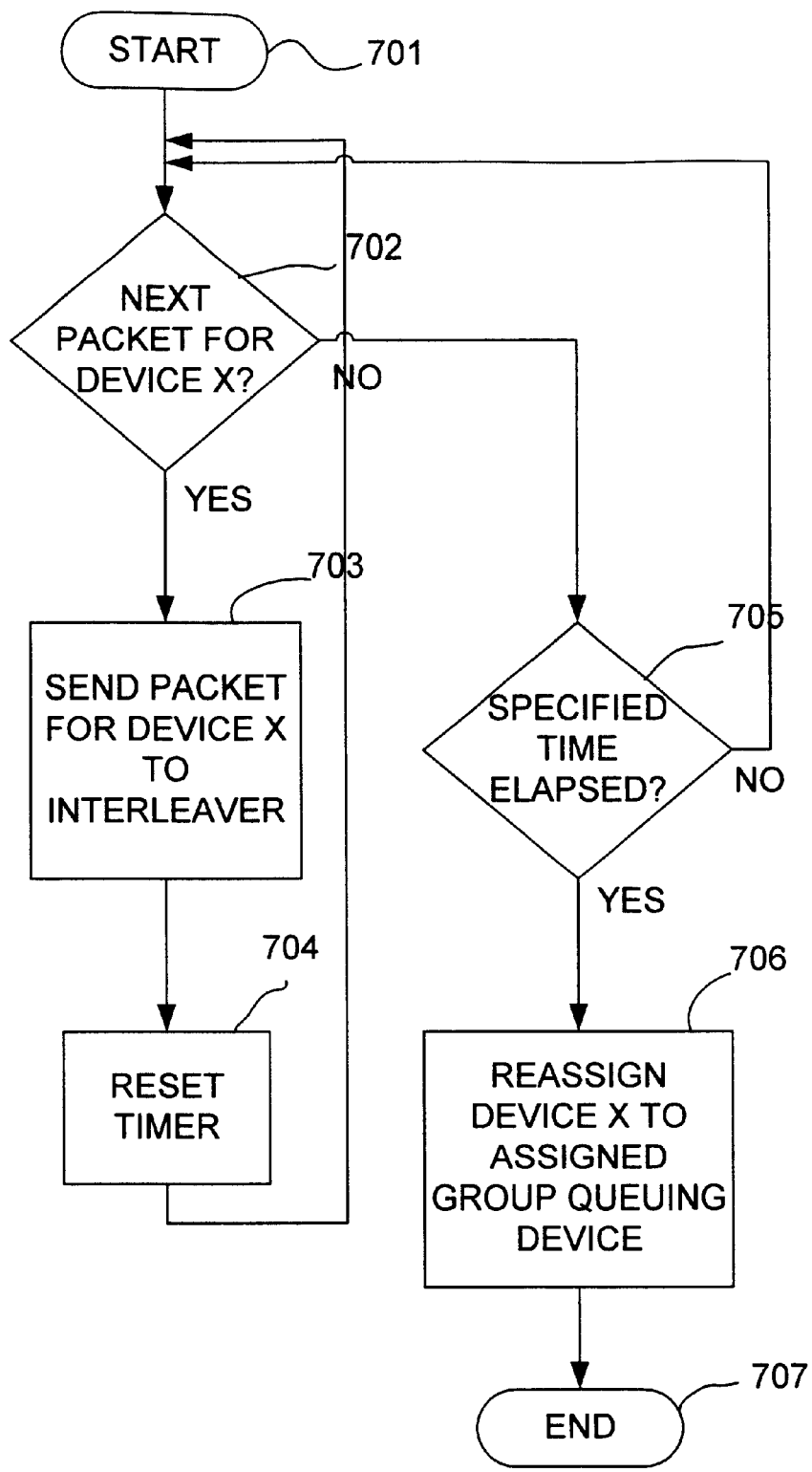
FIG. 7 is a flow diagram illustrating a process to for an active queuing device according to an embodiment of the invention.

FIG. 7 is a flow diagram illustrating a process to for an active queuing device according to an embodiment of the invention. The process begins in step 701. In step 702, a determination is made as to whether a next data packet has arrived destined for network device X. The destination for the data packet can be determined by referring to a network device address associated with the data packet. If the next data packet has arrived, the next data packet destined for network device X is sent to the interleaver in step 703. In step 704, a timer to measure a specified time after the queuing of a final data packet in a data message for a network device is reset, and the process returns to step 702.

If the next data packet has not arrived, the process continues in step 705. In step 705, a determination is made as to whether or not the specified time counted by the timer has elapsed. If not, the process returns to step 702. However, if the specified time counted by the timer has elapsed, the process continues in step 706. In step 706, network device X is reassigned to the group queuing device with which it is associated, in this case the group queuing device for group A. In step 707, the process ends.

Figure 8:
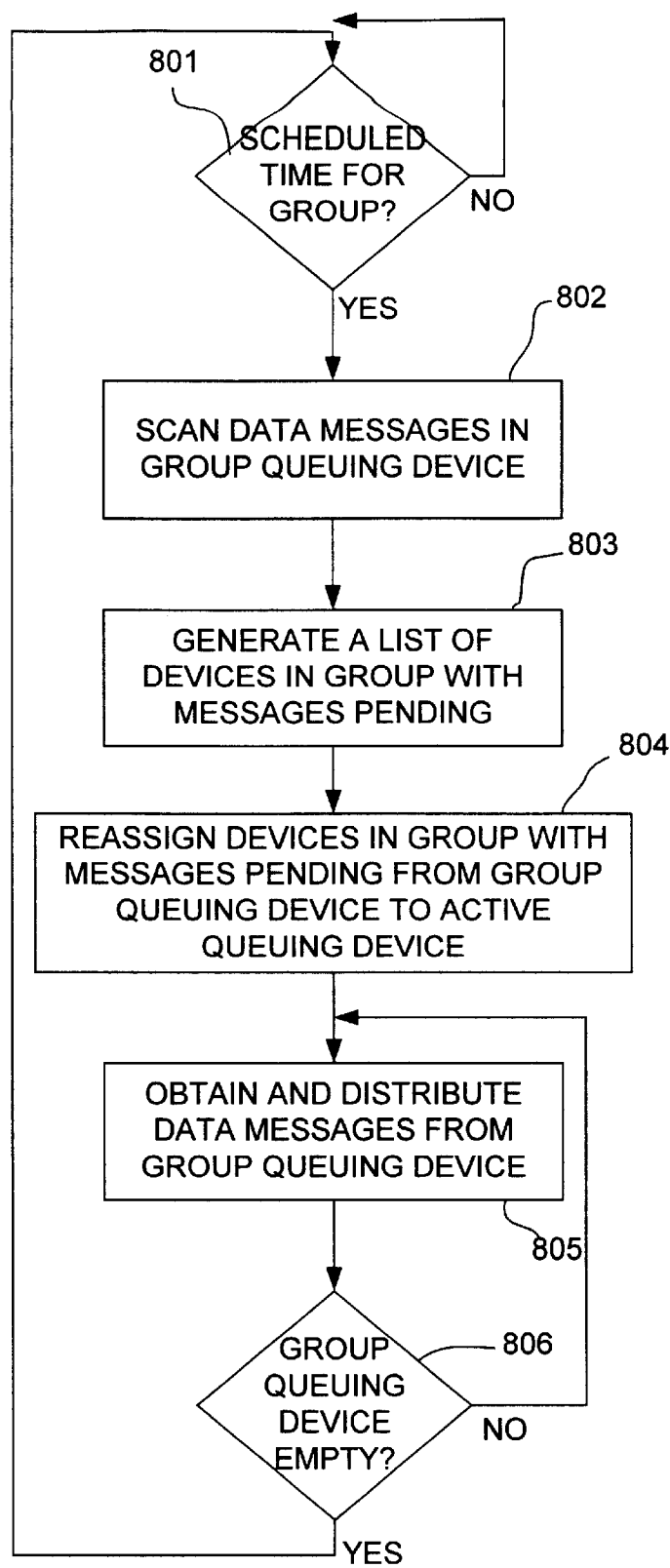
FIG. 8 is a flow diagram illustrating a process for an interleaver according to an embodiment of the invention.

FIG. 8 is a flow diagram illustrating a process for an interleaver according to an embodiment of the invention. In step 801, a determination is made as to whether or not a scheduled time for group X has arrived. If not, the process remains at step 801. However, if so, the process continues to step 802. At step 802, the interleaver scans data messages in the first group queuing device associated with group X to determine which of the network devices associated with group X have data messages pending. In step 803, the interleaver generates a list of network devices in group X for which there are data messages pending. In step 804, the interleaver reassigns these network devices in group X for which there are data messages pending from the first group queuing device to an active queuing device. In step 805, the interleaver obtains and distributes data messages from the first group queuing device associated with group X. In step 806, the interleaver determines whether the first group queuing device associated with group X is empty. If so, the process returns to step 801. If not, the process returns to step 805.

Figure 9:
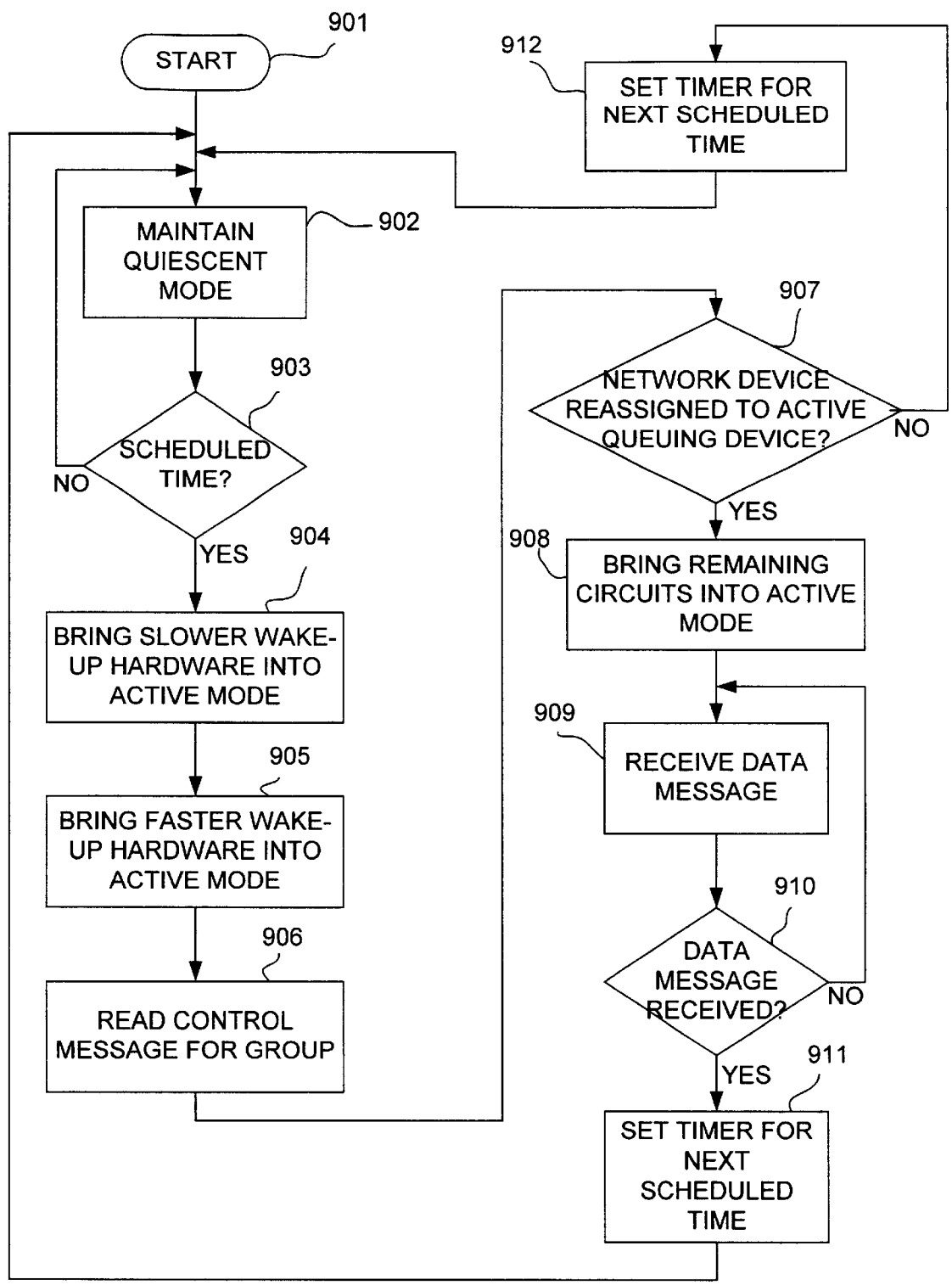
FIG. 9 is a flow diagram illustrating a process for a network device according to an embodiment of the invention.

FIG. 9 is a flow diagram illustrating a process for a network device according to an embodiment of the invention. The process begins in step 901. In step 902, the network device maintains itself in a quiescent mode. If it is not already in the quiescent mode, it places itself in the quiescent mode. The quiescent mode is a mode whereby components of the network device are either turned off or placed in mode of operation that greatly reduces the amount of power they require. A timer for determining when to switch from the quiescent mode to an active mode is maintained in an operational state to assure that the network device can enter the active mode at a scheduled time. The active mode is a mode whereby components of the network device needed to receive control messages are activated. If certain components of the network device are needed to receive a data message, but are not needed to receive a control message, those certain components may be kept turned off during the reception of the control message and only turned on if the control message provides an indication that the network device should expect to receive and prepare for receiving a data message.

In step 903, the network device determines whether a timer has finished counting to a scheduled time. If not, the process returns to step 902. If so, the process continues to step 904. In step 904, the network device begins activation of components having a longer wake-up time. In step 905, which occurs after step 904, the network device begins activation of components having a shorter wake-up time. In step 906, the network device reads a control message for the group to which the network device is assigned.

In step 907, the network device determines whether or not the network device has been reassigned to an active queuing device based on an indication provided by the control message. If not, the process continues in step 912, where the network device sets a timer for a next scheduled time at which the network device is to enter the active mode. From step 912, the process returns to step 902.

If, in step 907, the network device has been reassigned to the active queuing device, the process continues in step 908. In step 908, the network device activates any remaining components needed to receive a data message. In step 909, the network device receives the data message destined for it. In step 910, the network device determines whether the data message has been fully received. The network device may use a timer to determine if a specified time has elapsed since the completion of step 909. If not, the process returns to step 909. If so, the process continues to step 911. In step 911, the network device sets the time used in step 910 for a next scheduled time, and the process returns to step 902.

Figure 10:
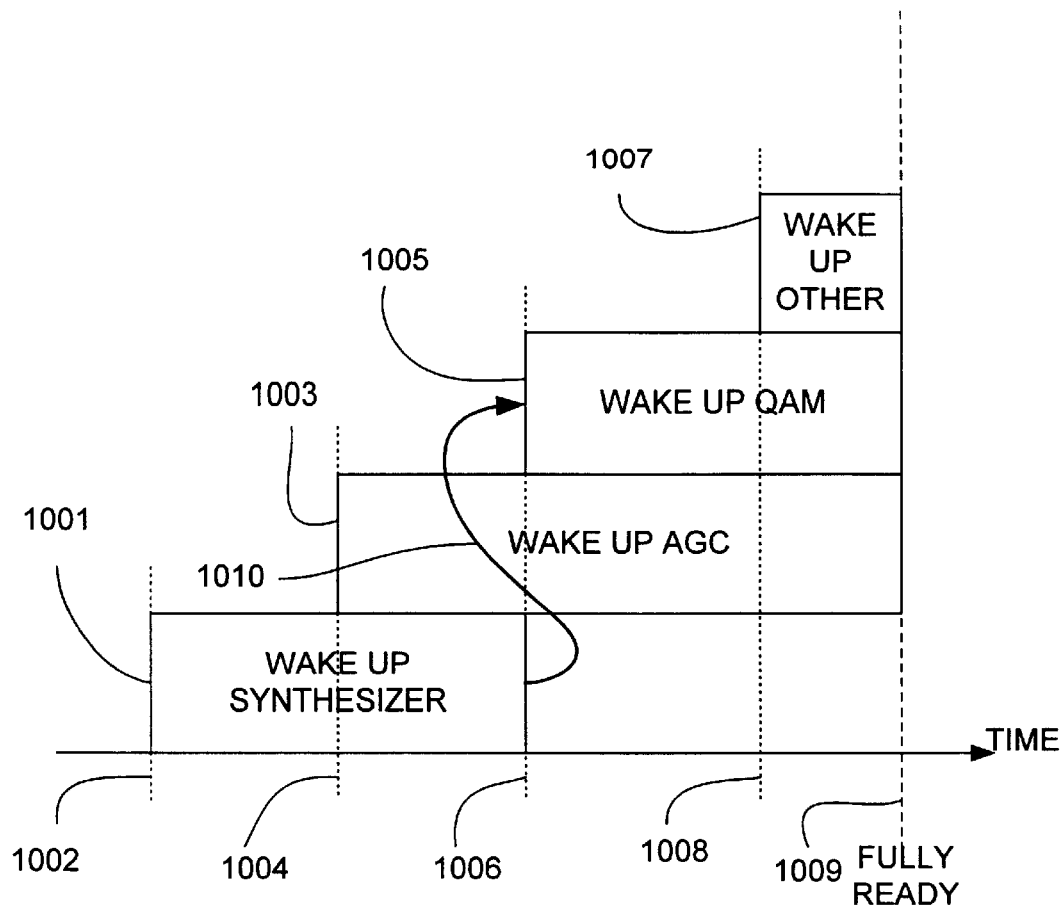
FIG. 10 is timing diagram illustrating a sequence for entering an active mode according to an embodiment of the invention.

FIG. 10 is timing diagram illustrating a sequence for entering an active mode according to an embodiment of the invention. Different components of a network device are activated at different times depending on the length of time they require to enter the active mode and any interdependencies that may exist between the different components. For example, if a frequency synthesizer takes a certain amount of time to enter the active mode and become stabilized and is required to be in the active mode by the time a QAM circuit begins to enter the active mode, its activation would begin at time 1002 and continue to time 1006, as indicated by timeline 1001. If an AGC circuit requires a substantial amount of time to enter the active mode, its activation would begin at time 1004 and continue to time 1009, as indicated by timeline 1003. At time 1006, the QAM circuit can begin its activation (since the frequency synthesizer is already in the active mode) and continue to time 1009, as indicated by timeline 1005. If other circuits require less time to enter the active mode, those circuits would begin to be activated at time 1008 and continue to time 1009, as indicated by timeline 1007.

One embodiment of the invention provides a method for reducing power consumption in a network device. The method includes several steps. The network device is caused to enter an active mode. This may occur in response to an external stimulus or at a scheduled time. The scheduled time may be determined using a timer. The timer is set to a count to the scheduled time, at which the network device enters the active mode.

The network device periodically receives a control message containing an indication of whether the network device should prepare to receive a data message. Depending on the indication provided in the control message, the network device either remains in the active mode or returns to a quiescent mode. If the control message indicates that the network device should prepare to receive a data message, the network device activates all components needed to receive the data message and receives the data message. If either the control message indicates that the network device need not prepare to receive a data message or the data message is received, the network device enters a quiescent mode.

Since the data message does not necessarily provide information to indicate that it has been fully received and that no other data messages are to be expected, a technique is provided to determine whether the data message has been received. To determine whether the data message has been received, a specified time is measured since completion of the step of receiving the data message. The completion of the step of receiving the data message may be considered as when the data stops. Since it is possible that the data will start again, for example, if the data of the data message is being transmitted in packets, waiting for a specified time after the data stops may be used to determine if the data message has been received.

For the network device to enter the active mode, components of the network device are activated based on the length of time they need to enter the active mode. For example, a first component of the network device having a longer initialization time is caused to begin its process of entering the active mode prior to components with slower initialization times. A second component of the network device having a shorter initialization time is caused to begin entering the active mode after the first component. Moreover, there may be some components of a network device that need to be activated to receive a control message, but additional components that need to be activated to receive a data message. Thus, a third component of the network device is caused to enter the active mode, if the network device requires the third component to be in the active mode to receive a data message.

This method may be performed through the use of an article of manufacture including a program storage device readable by a machine incorporated in a network device. The program storage device tangibly embodies a program of instructions executable by the machine to perform the method steps described above for reducing power consumption in a network device. The program storage device need not be located at single point in the system, but may be distributed over the system. For example, while some method steps may be performed at a network device, other method steps may be performed elsewhere in the system, for example at a headend subsystem.

An embodiment of the invention provides a method for reducing power consumption in a network device. A first plurality of network devices is assigned to a first group. A second plurality of network devices is assigned to a second group. A control message for the first group, referred to as a first group control message, is periodically transmitted to the first group, with the first group control message identifying a first active set of the first plurality of network devices that has traffic to be received. A control message for the second group, referred to as a second group control message, is periodically transmitted to the second group, with the second group control message identifying a second active set of the second plurality of network devices that has traffic to be received. The first active set of the first plurality of network devices is caused to enter an active mode in response to the first group control message. The traffic to be received by a first network device of the first active set of the first plurality of network devices is transmitted to the first network device. The first network device is removed from the first active set. The step of removing the first network device from the first active set can be performed by determining if a specified time has elasped since the step of transmitting the traffic to be received by the first network device of the first active set of the first plurality of network devices to the first network device. The second active set of the second plurality of network devices is caused to enter the active mode in response to the second group control message. The traffic to be received by the second network device of the second active set of the second plurality of network devices is transmitted to the second network device. The second network device is removed from the second active set.

This method may be practiced using an article of manufacture including a program storage device readable by a machine. The program storage device tangibly embodies a program of instructions executable by the machine to perform the method steps described above for reducing power consumption in a network device.

An embodiment of the invention provides a network system for communication with a plurality of network devices. The network system includes a plurality of queuing devices, a router, and an interleaver. The plurality of queuing devices includes a plurality of group queuing devices and an active queuing device. The router is operatively coupled to the plurality of queuing devices and is used to route traffic destined to the plurality of network devices to the plurality of queuing devices. The interleaver is operatively coupled to the plurality of queuing devices and used to transmit a control message identifying a first active set of a first group of the plurality of network devices and to combine the traffic from the plurality of queuing devices into a data stream. The first group of the plurality of network devices is assigned to a first group queuing device of the plurality of group queuing devices.

The interleaver causes the first active set of the first group of the plurality of network devices to be reassigned to the active queuing device. The interleaver, in conjunction with the IP router, causes a first network device of the first active set of the first group of the plurality of network devices to be reassigned from the active queuing device to the first group queuing device. The interleaver further combines additional data destined for an additional network device into the data stream. The additional network device remains in the active mode continuously. The additional network device is assigned to a separate queuing device separate from the plurality of group queuing devices and is not subject to being reassigned to the active queuing device.

The network system may also include a system management subsystem operatively coupled to the interleaver to generate system management messages. The interleaver further combines the system management messages into the data stream. Another feature of the network system is that a first subset of the first group of the plurality of network devices may be reassigned to a second group queuing device of the plurality of group queuing devices. Such reassignment is useful, for example, for load balancing so that high-bandwidth network devices are assigned to different groups.

An embodiment of the invention provides a hybrid-fiber-coaxial cable network system. The system includes a plurality of network devices and a headend subsystem. The headend subsystem is operatively coupled to the plurality of network devices and used to assign a first plurality of network devices to a first group and to assign a second plurality of network devices to a second group. The plurality of network devices are divided into a plurality of groups, including a first group and a second group. The plurality of network devices of the first group enter an active mode upon receiving a first group control message at a first scheduled time. The plurality of network devices of the second group enter an active mode upon receiving a second group control message at a second scheduled time.

A first network device of the plurality of network devices of the first group remains in the active mode for a first specified time after the first network device receives data destined for the first network device. The first network device enters a quiescent mode after the specified time has elapsed.

An embodiment of the invention provides a method including several steps. A first plurality of network devices is assigned to a first group. The first plurality of network devices is caused to enter a quiescent mode. First data messages directed to a first active set of the first plurality of network devices are routed. The first plurality of network devices are caused to enter an active mode. At a first known time, a control message identifying the first active set of the first plurality of network devices is transmitted. The first active set of the first plurality of network devices is reassigned from the first group to an active group. The network devices belonging to the first active set of the first plurality of network devices receive the first data messages. A first network device of the first active set of the first plurality of network devices is reassigned from the active group to the first group. The first network device is caused to again enter the quiescent mode.

The method may include additional steps. A second plurality of network devices may be assigned to a second group. The second plurality of network devices are caused to enter the quiescent mode. Second data messages directed to a second active set of the second plurality of network devices are routed. The second plurality of network devices are caused to enter the active mode. At a second known time, a control message identifying the second active set of the second plurality of network devices is transmitted. The network devices included in the second active set of the second plurality of network devices are reassigned from the second group to the active group. The second active set of the second plurality of network devices receives the second data messages. The second network device is caused to again enter the quiescent mode. A second network device of the second active set of the second plurality of network devices is reassigned from the active group to the second group.

A third network device is assigned to a third group. The third network device is reassigned from the third group to the first group. A second network device of the second active set of the second plurality of network devices is reassigned from the active group to the first group. The step of causing the first plurality of network devices to enter an active mode can be performed by initializing at an earlier time a first component of the first plurality of network devices to cause the first component to enter the active mode and by initializing at a later time a second component of the first plurality of network devices to cause the second component to enter the active mode, where the second component has a shorter initialization time that the first component. The first plurality of network devices is caused to enter a receive mode.

Another embodiment of the invention provides a cable system signalling product readable by a network device. The cable system signalling product embodies a control message to cause the network device to perform method steps for reducing power consumption in a network device. The method steps include periodically receiving at the network device the control message. The control message contains an indication of whether the network device should prepare to receive a data message. Another step is remaining in an active mode depending on the indication. Another step is receiving the data message. Another step is entering a quiescent mode.

The network device enters the active mode at a scheduled time. The scheduled time can be changed. Changing the scheduled time can be performed to assign a network device from one group to another group, since the control message for each group is transmitted at a different time.

Another embodiment of the invention provides another method. The first step of this method is waiting until a first scheduled time. A first active set of a first plurality of network devices is then identified. Network devices included in the first active set of the first plurality of network devices are reassigned from a first group to an active group. A first plurality of messages are removed from a first queuing device and the first plurality of messages are passed to the first active set of the first plurality of network devices. Then a determination is made as to whether or not the first queuing device is empty.

Another embodiment of the method includes the steps of waiting for a message addressed to a first network device unless a timer expires first, forwarding the message addressed to the first network device to an interleaver, restarting the timer, and reassigning the first network device from an active group to a first group upon expiration of the timer.

Accordingly, a method and apparatus for reducing power consumption in a network device is provided. Not only is the power consumption of a particular network device reduced, but the time during which the power is consumed can be controlled. Thus, for a network or a subnetwork of a network, the timing of the power consumption of individual network devices can be controlled and coordinated to minimize the peak power consumption of common power supply providing power to the network devices of the network or subnetwork. The invention may also be applied to network devices having local power supplies. By reducing power consumption in a network device, network devices may be made lighter and smaller since heavy and bulky components needed for high power consumption are obviated. Consequently, devices that have not heretofore been connected to a network, for example household appliances, may be added to a network as additional network devices without prohibitive cost, size, weight, and/or power consumption problems. Other advantages will also be apparent to those of ordinary skill in the art.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for reducing power consumption in a network device comprising the steps of:

assigning a first plurality of network devices to a first group;

assigning a second plurality of network devices to a second group;

periodically transmitting a first group control message to the first group, the first group control message identifying a first active set of the first plurality of network devices that has traffic to be received;

periodically transmitting a second group control message to the second group, the second group control message identifying a second active set of the second plurality of network devices that has traffic to be received;

causing the first active set of the first plurality of network devices to enter an active mode in response to the first group control message;

transmitting the traffic to be received by a first network device of the first active set of the first plurality of network devices to the first network device;

removing the first network device from the first active set;

causing the second active set of the second plurality of network devices to enter an active mode in response to the second group control message;

transmitting the traffic to be received by the second network device of the second active set of the second plurality of network devices to the second network device; and removing the second network device from the second active set.

2. The method of claim 1 wherein the step of removing the first network device from the first active set comprises the step of:

determining if a specified time has elapsed since the step of transmitting the traffic to be received by the first network device of the first active set of the first plurality of network devices to the first network device.

3. A method comprising the steps of:

assigning a first plurality of network devices to a first group;

causing the first plurality of network devices to enter a quiescent mode;

routing first data messages directed to a first active set of the first plurality of network devices;

causing the first plurality of network devices to enter an active mode;

transmitting at a first known time a control message identifying the first active set of the first plurality of network devices;

reassigning the first active set of the first plurality of network devices from the first group to an active group;

receiving at the first active set of the first plurality of network devices the first data messages;

reassigning a first network device of the first active set of the first plurality of network devices from the active group to the first group; and causing the first network device to again enter the quiescent mode.

4. The method of claim 3 comprising the steps of:

assigning a second plurality of network devices to a second group;

causing the second plurality of network devices to enter the quiescent mode;

routing second data messages directed to a second active set of the second plurality of network devices;

causing the second plurality of network devices to enter the active mode;

transmitting at a second known time a control message identifying the second active set of the second plurality of network devices;

reassigning the second active set of the second plurality of network devices from the second group to the active group;

receiving at the second active set of the second plurality of network devices the second data messages; and causing a second network device of the second active set of the second plurality of network devices to again enter the quiescent mode.

5. The method of claim 4 further comprising the step of:

reassigning the second network device from the active group to the second group.

6. The method of claim 5 comprising the step of:

assigning a third network device to a third group; and reassigning the third network device from the third group to the first group.

7. The method of claim 4 further comprising the step of:

reassigning the second network device from the active group to the first group.

8. The method of claim 3 wherein the step of causing the first plurality of network devices to enter the active mode further comprises the steps of:

initializing at an earlier time a first component of the first plurality of network devices to cause the first component to enter the active mode; and initializing at a later time a second component of the first plurality of network devices to cause the second component to enter the active mode, the second component having a shorter initialization time than the first component.

9. The method of claim 3 further comprising the step of:

causing the first plurality of network devices to enter a receive mode.

10. A program storage device readable by a machine, the program storage device tangibly embodying a program of instructions executable by the machine to perform method steps for reducing power consumption in a network device, the method steps comprising:

assigning a first plurality of network devices to a first group;

assigning a second plurality of network devices to a second group;

periodically transmitting a first group control message to the first group, the first group control message identifying a first active set of the first plurality of network devices that has traffic to be received;

periodically transmitting a second group control message to the second group, the second group control message identifying a second active set of the second plurality of network devices that has traffic to be received;

causing the first active set of the first plurality of network devices to enter an active mode in response to the first group control message;

transmitting the traffic to be received by a first network device of the first active set of the first plurality of network devices to the first network device;

removing the first network device from the first active set;

causing the second active set of the second plurality of network devices to enter the active mode in response to the second group control message;

transmitting the traffic to be received by the second network device of the second active set of the second plurality of network devices to the second network device; and removing the second network device from the second active set.

11. The program storage device of claim 10 wherein the step of removing the first network device from the first active set comprises:

determining if a specified time has elapsed since the step of transmitting the traffic to be received by the first network device of the first active set of the first plurality of network devices to the first network device.

* * * * *